US010649186B2

(12) United States Patent
Lundin et al.

(10) Patent No.: US 10,649,186 B2
(45) Date of Patent: May 12, 2020

(54) MOBILE MICROSCOPE

(71) Applicant: HELSINGIN YLIOPISTO, Helsingin Yliopisto (FI)

(72) Inventors: Johan Lundin, Kauniainen (FI); Antti Suutala, Oulu (FI); Hannu Moilanen, Oulu (FI)

(73) Assignee: HELSINGIN YLIOPISTO, Helsingin Yliopisto (FI)

( * ) Notice: Subject to any disclaimer, the term of this patent is extended or adjusted under 35 U.S.C. 154(b) by 54 days.

(21) Appl. No.: 15/755,401

(22) PCT Filed: Aug. 26, 2016

(86) PCT No.: PCT/FI2016/050584
§ 371 (c)(1),
(2) Date: Feb. 26, 2018

(87) PCT Pub. No.: WO2017/037334
PCT Pub. Date: Mar. 9, 2017

(65) Prior Publication Data
US 2018/0246306 A1    Aug. 30, 2018

(30) Foreign Application Priority Data

Aug. 28, 2015  (FI) .................................. 20155618

(51) Int. Cl.
*G02B 21/00*    (2006.01)
*G02B 21/16*    (2006.01)
(Continued)

(52) U.S. Cl.
CPC ......... *G02B 21/0008* (2013.01); *G02B 5/208* (2013.01); *G02B 5/22* (2013.01);
(Continued)

(58) Field of Classification Search
CPC ...... G02B 21/0008; G02B 5/208; G02B 5/22; G02B 5/283; G02B 21/16; G02B 21/26; G02B 21/64; A61B 5/0071
(Continued)

(56) References Cited

U.S. PATENT DOCUMENTS 6,177,990 B1    1/2001  Kain et al.
6,525,875 B1 *  2/2003  Lauer .................. G03H 1/0443
                                              359/368
(Continued)

FOREIGN PATENT DOCUMENTS

EP    WO 2009/088930    7/2009
EP    2 202 444         6/2010
(Continued)

OTHER PUBLICATIONS

International Search Report for PCT/FI2016/050584, dated Nov. 17, 2016, 4 pages.
(Continued)

*Primary Examiner* — Stephone B Allen
*Assistant Examiner* — Adam W Booher
(74) *Attorney, Agent, or Firm* — Nixon & Vanderhye P.C.

(57) ABSTRACT

The invention relates to a mobile microscopic imaging device comprising a sample stage for holding a sample to be imaged, at least one light source for illumination of the sample, an imaging panel capable of capturing an image of the sample upon transmission illumination of the sample by the light source, and an optical magnification unit between the sample and the imaging panel for guiding light from the illuminated sample to the imaging panel so that a magnified image of at least portion of the sample is formed at the imaging panel. According to the invention, the optical magnification unit comprises a filter integrated polymeric lens assembly in a transmitted light fluorescence configu- (Continued)

ration which allows for both miniaturization of the device to a truly mobile level and reducing manufacturing costs.

17 Claims, 6 Drawing Sheets

(51) Int. Cl.
| | |
|---|---|
| *G02B 5/20* | (2006.01) |
| *G02B 5/22* | (2006.01) |
| *G02B 5/28* | (2006.01) |
| *G02B 21/26* | (2006.01) |

(52) U.S. Cl.
CPC .............. *G02B 5/283* (2013.01); *G02B 21/16* (2013.01); *G02B 21/26* (2013.01)

(58) Field of Classification Search
USPC ......................................... 359/368, 385, 388
See application file for complete search history.

(56) References Cited

U.S. PATENT DOCUMENTS

| | | | | |
|---|---|---|---|---|
| 6,950,241 | B1* | 9/2005 | Liang ....................... | G02B 9/34 359/660 |
| 7,023,622 | B2* | 4/2006 | Liang ..................... | G02B 21/02 359/660 |
| 7,742,213 | B2* | 6/2010 | Potsaid .............. | G02B 21/0048 359/212.1 |
| 8,624,967 | B2* | 1/2014 | O'Connell ......... | G02B 21/0008 348/79 |
| 10,274,712 | B2* | 4/2019 | Doric .................. | G02B 21/082 |
| 2007/0253057 | A1* | 11/2007 | Potsaid ................ | G02B 21/002 359/384 |
| 2008/0204551 | A1* | 8/2008 | O'Connell ......... | G02B 21/0008 348/79 |
| 2011/0001036 | A1* | 1/2011 | Stallinga ............ | G02B 21/0032 250/208.1 |
| 2011/0168915 | A1* | 7/2011 | Yajima ............... | G01N 21/6428 250/459.1 |
| 2011/0188782 | A1 | 8/2011 | Thompson et al. | |
| 2012/0157160 | A1 | 6/2012 | Ozcan et al. | |
| 2012/0234393 | A1 | 9/2012 | Maltezos et al. | |
| 2013/0129181 | A1 | 5/2013 | Glensbjerg et al. | |
| 2014/0362239 | A1 | 12/2014 | Larson | |
| 2015/0177147 | A1 | 6/2015 | Mangan et al. | |
| 2017/0363849 | A1* | 12/2017 | Doric ................... | G02B 21/082 |

FOREIGN PATENT DOCUMENTS

| | | |
|---|---|---|
| EP | 2 333 524 | 6/2011 |
| GB | 2511362 | 9/2014 |
| JP | 9-292570 | 11/1997 |
| KR | 100584678 | 5/2006 |

OTHER PUBLICATIONS

Written Opinion of the ISA for PCT/FI2016/050584, dated Nov. 17, 2016, 9 pages.
Search Report Issued in FI 20155618 dated Feb. 19, 2016, 2 pages.
Mauk et al. "Microfluidic Devices for Nucleic Acid (NA) Isolation, Isothermal NA Amplification, and Real-Time Detection" in *Clinical Applications of Mass Spectrometry*, vol. 1256, Dec. 5, 2014, pp. 15-40.
Breslauer et al. "Mobile Phone Based Clinical Microscopy for Global Health Applications", PLOS ONE, vol. 4, No. 7, Jul. 2009, pp. 1-7, e6320.
Gan et al. "A Prototype Miniaturized Chip for Bio-Imaging Applications", Conference on Lasers and Electro-Optics, (CLEO), May 4, 2008, pp. 1-2.
Yamaguchi et al. "Recent Technology and Usage of Plastic Lenses in Image Taking Objectives" SPIE, XP040207723, vol. 5872, Sep. 30, 2005, 8 pages.
CN Search Report with translation for Appln. No. 201680049263.9, dated Nov. 27, 2019, 4 pages.

* cited by examiner

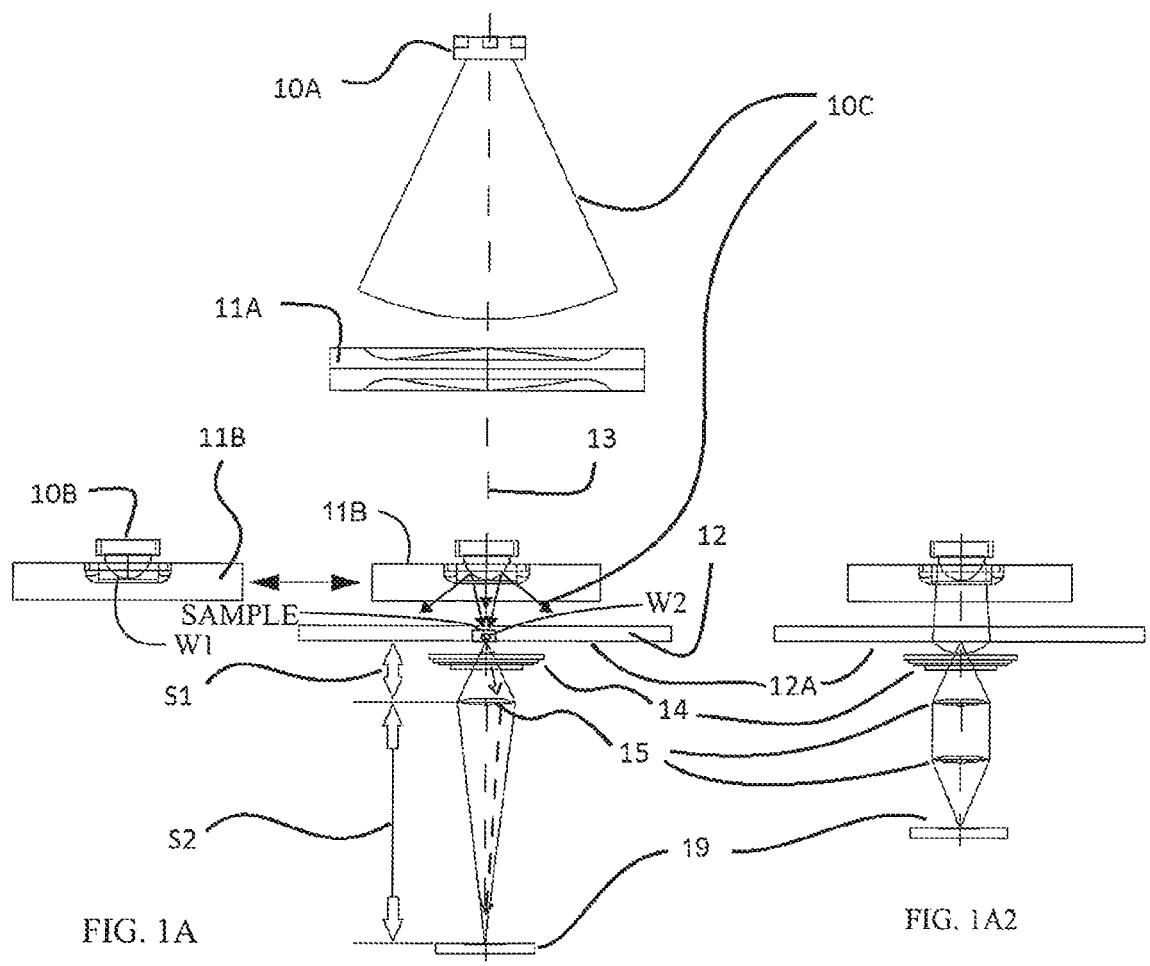
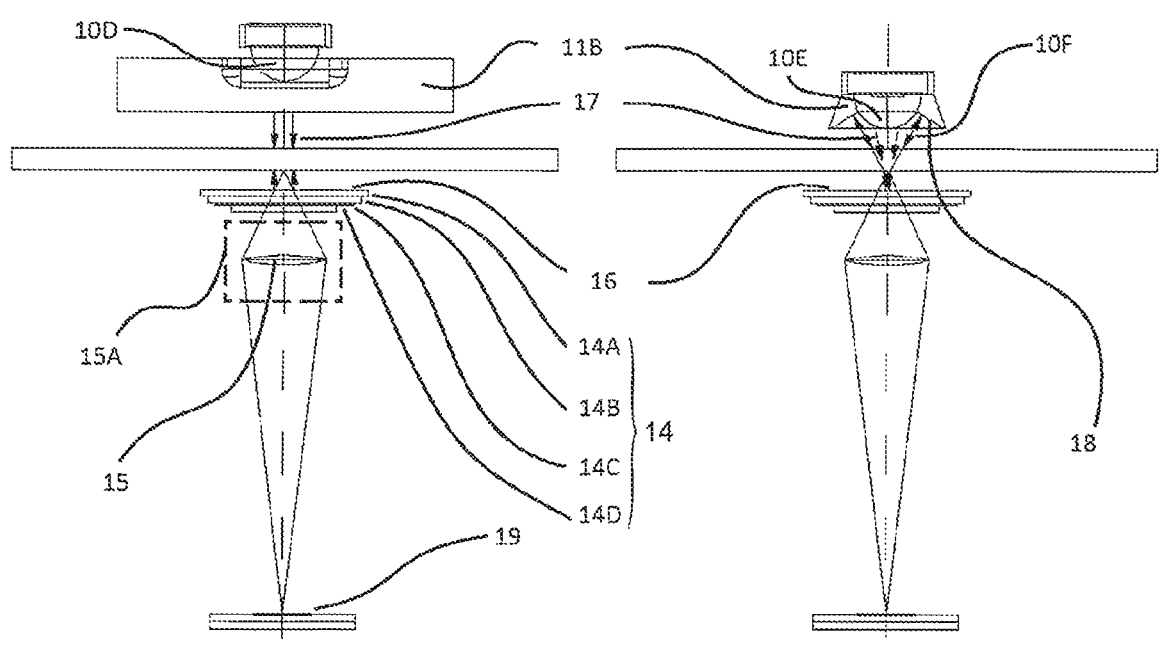
FIG. 1B1  FIG. 1B  FIG. 1B2

MOBILE MICROSCOPE

This application is the U.S. national phase of International Application No. PCT/FI2016/050584 filed Aug. 26, 2016, which designated the U.S. and claims priority to FI Patent Application No. 20155618 filed Aug. 28, 2015, the entire contents of each of which are hereby incorporated by reference.

FIELD OF INVENTION

The invention relates to optical microscopic imaging. In particular, the invention relates to a mobile microscope suitable for use in point-of-care diagnostics, for example.

BACKGROUND ART

Modern medical point-of-care (POC) methods benefit from the capability of high-quality optical diagnosis devices that are easily movable close to a patient to be diagnosed. The ability to capture high quality microscopic images of samples taken from patients without delay, for example for determining a disease, offers a possibility to provide rapid and accurate treatment for the patient. Early diagnosis and treatment is at the present not possible in particular in developing countries, where traffic communications/roads and vehicles are poor and the network of permanent laboratories capable of performing the required tests is sparse. However, there are many situations, also in developed countries, in which point-of-care would offer advantages for the patients or the care organization.

Numerous devices for microscopic imaging have been developed for point-of-care purposes. Light microscopes form a basic group of these devices.

However, there is a need for improved mobile microscopes in particular for POC applications, but also for other purposes.

SUMMARY OF INVENTION

A mobile microscopic imaging device, use of a mobile microscope with at least one polymer lens in at least one magnifying objective and a method for imaging are described in this application.

More specifically, the invention is characterized by what is stated in the independent claims.

The invention provides advantages. Due to sufficient optical capabilities of the at least one polymeric lens, the detector and the objective lens may be maintained close to each other in order to maintain short optical paths which, in turn, enables a smaller structure and easier portability compared to conventional microscopes.

Next, embodiments of the present technology and advantages thereof are discussed in more detail with reference to the attached drawings.

BRIEF DESCRIPTION OF THE DRAWINGS

FIG. 1A, comprising FIGS. 1A1 and 1A2, shows examples of cross sectional views of optical constructions of the microscope according to two embodiments;

FIG. 1B, comprising FIGS. 1B1 and 1B2, illustrates examples of detailed views of the optical lens unit and excitation setups of the microscope according to two embodiments;

FIG. 2 shows an example of a 3-dimensional view of mechanical construction of the microscope according to one embodiment;

DESCRIPTION OF EMBODIMENTS

Figure 1C:
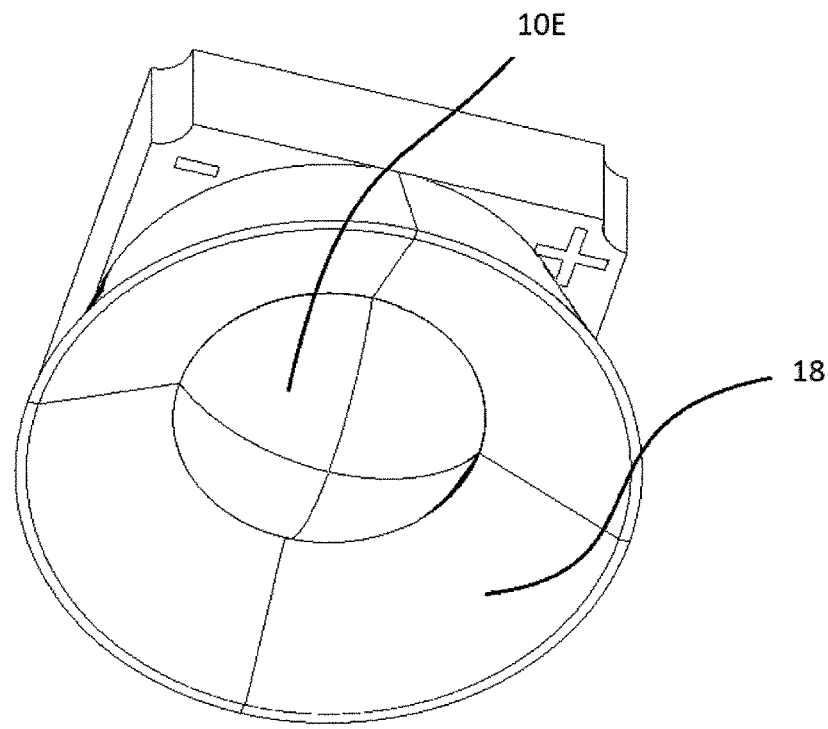
FIG. 1C illustrates an example of a detailed 3-dimensional view of mechanical construction of enhanced excitation source.

The following embodiments are only examples. Although the specification may refer to "an" embodiment or embodiments in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in the Figures may refer to logical or physical connections. It is apparent to a person skilled in the art that the described microscope may also comprise other functions and structures than those described in Figures and text. It should be appreciated that details of some functions and structures used for measurement are irrelevant to the actual invention. Therefore, such irrelevant features to the invention need not be discussed in more detail here.

The term "mobile microscope" in the present context refers to such devices, which contain all essential optical parts for imaging as herein described and claimed (not however including a control and image analysis/storage computer) and have a maximum outer dimension which is less than about 20 cm. In fact, the present microscope may be fitted into a casing having a maximum outer dimension of about 15 cm or less, in particular about 10 cm or less, making the device truly mobile and easy to carry.

Consider now shortly operational and structural targets of a mobile microscope. Typically a mobile microscope should be of small size and inexpensive. The microscope should be capable of common diagnosis imaging by fluorescence, in particular by the transmission fluorescence method, potentially in combination with imaging using white light, employing at least one polymer lens in magnifying objectives.

It is desirable that fluorescence imaging and bright field imaging are combined because the fluorescence may easily resolve targeted diseases in size beyond the imaging resolution.

Inexpensive plastic molded objectives are therefore desirable, integrated with features, such as LED excitation, illumination and optical filters, diffuser and imager together.

A microscope should thereby be provided in which the distances between the functional elements are short.

A target is a novel kind of mobile, miniaturized transmission fluorescence and bright field microscope.

The present embodiments explained below efficiently deal with problems that otherwise may occur and which conventionally would relate, for example, to realization of efficient excitation source, the light of which generates fluorescence in a sample, in small size.

A conventional problem relating to polymer lenses is auto fluorescence of polymer materials, which is notably high at UV excitation and observed also disturbing at visible wavelengths. Such auto fluorescence of plastic polymers in lenses conventionally destroys the high quality dark background commonly required in imaging.

Color or monochrome imagers on chip polymer layers, like color filters and light collecting lenses, exhibit auto fluorescence, thus interfering with the high quality dark background commonly required in imaging.

As explained in more detail below, potential problems relating to the auto fluorescence of imaging optics may be eliminated. More particularly, the transmission fluorescent method used herein allows polymer lens based construction to be realized and thus to be utilized in mobile microscope POC purposes.

Excitation filter as well as emission filter constructions are provided which give dark fluorescence image background. Still the structure may be kept small.

Bright field illumination gives flat light intensity field.

Figure 2:
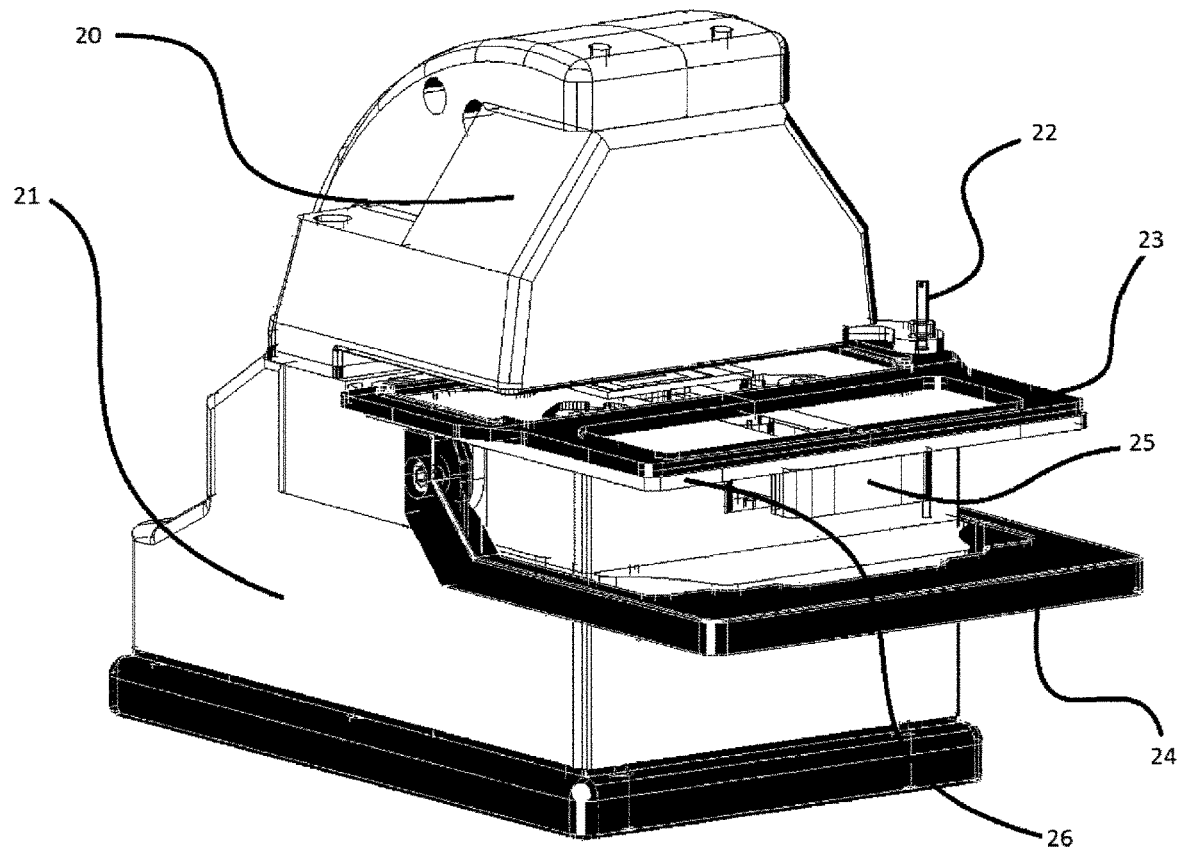

In an embodiment an example of which is illustrated in FIGS. 1A1 and 1A2, the excitation source 10B for the transmission fluorescence method is at least one light emitting diode (LED). The excitation source 10B may comprise an array or a matrix of LEDs, where the number of LEDs is two or more. In an embodiment, the LED source is used as such without a large size, separate collector and condenser lenses to aim the excitation. It may have a small size collector glass dome in which the integrated excitation emitter filter coupler may be formed. This is possible because the excitation source is close to a sample a.k.a a specimen. That is, the excitation source 10B may be adjacent or more specifically directly adjacent to a sample stage 12 which holds the sample. This results in small size of the microscopic imaging device. However, the excitation filter 11B, which is typically thin (thickness about 1 mm or less), may be between the excitation source 10B and a sample stage.

The at least one excitation light source 10B emits non-collimated excitation light in order to illuminate an imaged area W2 for illuminating the sample on a surface plane of the sample stage 12. The excitation light is still non-collimated when it arrives at the stacked filter 14. The excitation light is non-collimated at the stacked filter 14, at least partly because the stacked filter 14 is adjacent or directly adjacent to the sample stage 12 and thus also the illuminated area W2 which includes the sample wholly or partly. Another and more important reason is the non-collimated emission. The dashed line in FIG. 1A1 shows a ray of the non-collimated light. The dashed line also shows that if the stacked filter 14 didn't block the non-collimated excitation light, the non-collimated excitation light would propagate up to the imaging panel 19. The stacked filter 14 also blocks the collimated rays of the excitation light.

In an embodiment, the at least one excitation light source 10B may be a point-source. In an embodiment, the at least one excitation light source 10B may be a non-point-source.

In an embodiment, an illuminating area W1 (curved surface in FIG. 1A1) of the at least one excitation light source 10B which directs the excitation light to the imaged area W2, may be larger than the imaged area W2. Although FIG. 1A1 isn't accurately in scale, the difference in the areas W1 and W2 is clearly shown. In this example, it can be determined that the excitation source 10B isn't a point source in a practical sense. The illuminating area W1 may be larger than 1 mm$^2$, for example. The imaged area may be smaller than 1 mm$^2$, for example. The size difference between the illuminating are W1 and the imaged area W2 results in angles 10C of the excitation light which are different from the normal of the stacked filter 14, ie. the excitation light is non-collimated.

At least one LED gives an excitation irradiance level sufficient for obtaining stained specimen to emit enough fluorescent light.

In an embodiment, at least one LED used for excitation is combined in use with at least one low pass filter 11B in order to block excitation wavelengths which are in a fluorescent emission spectrum of interest.

In an embodiment, this excitation filter 11B is based on an absorption filter.

Absorption filters 11B may be used because they allow functional integration to excitation LED by two means. Firstly, they are typically made from glass allowing support for functional parts and secondly they may be shaped in a proper manner together with the integrated LED package. Shaping of the absorption filter denotes here manufacturing of spherical light collecting lens block and high reflectance surfaces at emission wavelength. In detail, lens block also has a specifically formed ring shaped high excitation wavelength reflectance surface which reflects the excitation wavelength back to the stained specimen.

In one or more embodiment, the at least one filter may be located between the magnifying objective and a position associated with the sample stage at which the specimen is located during examination. Such an arrangement, such a proper positioning, avoids the risk that auto fluorescence, which is caused by one or more objective polymer lenses, the imager on chip polymer layer color filter, and a light collecting lens, destroys the high quality dark background required.

Said selection of a location of the stacked filter 14 may serve such a goal that light caused by auto fluorescence is eliminated. Said selection of a location of the stacked filter 14 may also serve such a goal that excitation is intensified by reflecting the excitation wavelengths back to specimen from the stacked filter 14. This may hold true when the stacked filter 14 on the specimen's side, i.e. the filter closest to the specimen, is a dielectric interference filter.

This system together with an integrated excitation LED package may allow for even greater intensification of excitation due to the fact that back and forth excitation reflections are utilized.

A possibility to intensify excitation may be applicable to all wavelengths used in fluorescence microscopy.

In an embodiment an example of which is illustrated in FIG. 1B1, the stacked filter 14 may be used to block the excitation. Typically the required attenuation may be achieved by stacking a plurality of band pass filters 14A to 14D on top of the objective lens 15. This avoids the problems that may be caused by using only dielectric filters. To wit, incident light angle dependent leakage of excitation might cause problems achieving high quality dark background image. In the embodiments, one of the stacked filters may be an absorption filter located as close as possible to the magnifying objective, thus eliminating any auto fluorescence of the filter itself.

Fixed short distance bright field white light may require diffuser structure 11A which are constructed in a proper manner in order to obtain high S/N ratio of imager's areal, i.e. flat field.

This may be done by using at least one white light LED as a white light source 10A in which the coupled irradiation pattern may be matched together with systems vignette errors. In detail, the system may have a gradient diffuser (diffuse structure 11A) in which the optical axis light path will be attenuated more than corner and side light paths. This may be done inexpensively in means of modulating the thickness of visible wavelength permeable volume diffuser which may be made of plastic, for example.

In addition, the present mobile microscopic imaging device comprises a sample stage for holding a sample on the microcopy glass 12 to be imaged, an excitation light source 10B, a digital imaging panel 19 capable of capturing an image of the sample during the transmission light illumination, and optical magnification unit 15 between the sample and the imaging panel 19 for guiding light from the sample to the imaging panel 19 so that a magnified image of at least portion of the sample, i.e. the imaged area W2, is formed at the imaging panel 19. The sample stage is typically not shown in images. The optical magnification unit 15 comprises at least one polymeric lens. In an embodiment, the at least one lens may be manufactured by molding.

The mobile microscopic imaging device has a sample stage for holding a sample to be imaged. The at least one excitation light source 10B transmits the excitation light in order to illuminate the sample on a surface plane of the sample stage where the sample is usually on surface plane 12A of a microscopy glass 12. An imaging panel 19 captures an image of the sample with fluorescent light generated by the sample in illumination of the excitation light. An optical magnification unit 15 between the sample and the imaging panel 19 guides light from the illuminated sample to the imaging panel 19 for forming a magnified image of at least portion of the sample, i.e. the imaged area W2, at the imaging panel 19, said optical magnification unit 15 comprising at least one polymeric lens 15. The stacked filter 14 is placed between the surface plane 12A of the sample stage and the at least one polymeric lens 15. The stacked filter 14 prevents the excitation light of the excitation light source 10B from propagating to the imaging panel 19. The fluorescent light generated by the sample when the excitation light is directed to the sample may be visible light or light of other wavelength range which is longer than that of the exciting light.

Some exemplary ways of implementing a miniaturized high resolution hybrid imaging device are described below. The description concentrates on an implementation with combined backlight bright field, i.e. white light, and fluorescence generation in transmission mode. The at least one white light source 10A may be used for backlight illumination of the sample. In addition, enhanced excitation using LED package comprising integrated light collecting band pass filter 11B and light reflector (with reflective thin film 18), is explained. Ultraviolet (UV) excitation for the fluorescence imaging may be taken as an example—constructions presented here may be applicable also for cases of excitation with visible light, in exception that visible light excitation may not cause so severe autofluorescence effects compared to UV.

Turning next to the drawings, it can be noted that FIG. 1A shows an example of the optical configuration of the present microscope according to two examples, FIGS. 1A1 and 1A2. An example of FIG. 1A1 presents a conventional type miniaturized microscope and an example of FIG. 1A2 special type of reversed camera lens configuration. Both of the setups have been made from polymer magnifying lenses.

The reversed camera lens configuration (FIG. 1A2) may be applied when the objective lens assembly 15, i.e. the at least one polymer lens, has more than one lens. In the reversed camera lens technique, the order of the lenses in the optical path is turned around. The reverse camera lens technique refers to a macro lens assembly the order of the lenses of which are opposite to the original use of the macro lens assembly. The original objective lens element of the objective lens assembly, which is conventionally closer to the observed object than the ocular or the detecting side, is shifted to be closer to the ocular or the detecting side. Correspondingly, the original objective lens element of the objective lens assembly, which is conventionally closer to the ocular or the detecting side than the observed object, is shifted to be closer to the object.

The reversed camera lens configuration of FIG. 1A2 may refer to a mobile phone set up in which the lens closer to the imager is a standard infinity corrected lens (assembly) and not reversed or moved from its position. The lens (assembly) 15 closer to the specimen is designed to form image to infinity, which is collected with the mobile phone lens. Denomination of reversed lens configuration comes from the fact that if the specimen side lens (assembly) is made from standard mobile phone lens it must be reversed.

On a general level, the microscope may comprise two alternative light sources 10A, 10B, a microscopy glass 12, optical elements 14 (stacked filter), 15 (objective lens), and an imaging panel 19. Surface plane 12A may be the location for the specimen. If thick wet samples are being imaged, special type wet mount, cavity on microscope glass, may be used. Magnification of the microscope according to FIG. 1A1 system may be fixed via object distance S1 and image distance S2. Magnification of the example of FIG. 1A2 setup, with the reversed lens configuration, is based on the ratio of the focal lengths of the individual lens systems, one being infinity corrected cell phone lens. For simplicity, only configuration of FIG. 1A1 setup will be shown in following images.

One of the light sources may comprise a white light source 10A, which is in this configuration arranged at constant position at the optical axis 13 of the microscope.

Figure 4A:
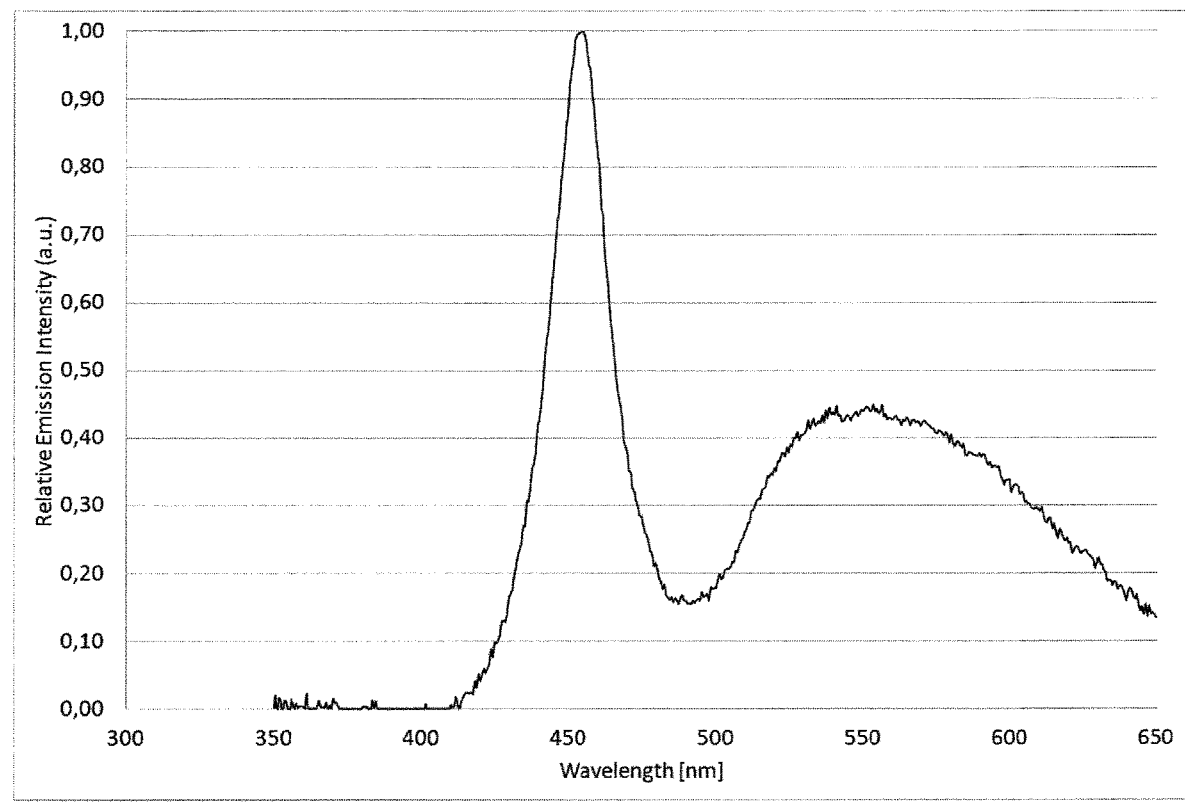
FIG. 4A shows exemplary white light LED emission spectrum usable in connection with the invention.

An example of the emission spectrum of the white light source is shown in FIG. 4A.

In front of the white light source 10A, there may be a visible wavelength permeable volume diffuser 11A optimizing vignette errors of the imaging system and thus the highest imager's areal S/N ratio i.e. flat field. It may be constructed so that the original flat thickness (in a dimension of 2 mm as an example not limiting to this value) is modulated to give the optical axis light path attenuated more than the corner and side light paths.

A second light source may comprise an ultraviolet (UV) light source 10B. Both the white light source 10A and the UV light source 10B may be forming the radiant flux within angles 10C. A UV absorption band pass filter 11B in front of the UV light source 10B may be applied ensuring that no undesired wavelengths outside the UV excitation range are provided to the specimen or image forming optics. The stacked filter 14 with the stacked filters 14A to 14D is configured to block zero degree incident angle rays as well as the rays of the excitation light the direction of which differs from that of the normal of the surface of the filter 14, ie. the dielectric filter 14A on the top. Here the zero angle incident angle refers to or means the same as the direction of the normal of the surface of the stacked filter 14. The stacked filter 14 works like this also in the case the excitation/illuminating light is visible light. The dielectric filter 14A reflects the excitation light towards the imaged area W2. That lowers the optical power requirement of the excitation source.

Figure 3A:
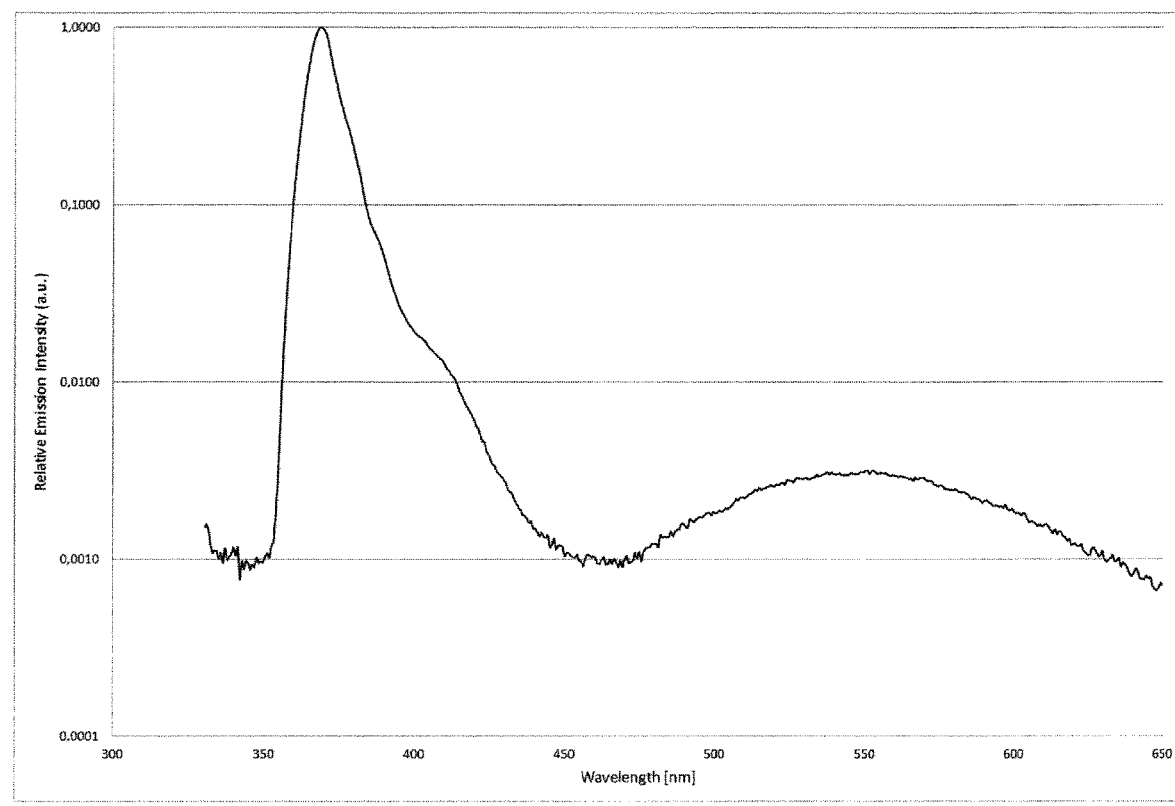
FIG. 3A shows exemplary UV LED emission spectrum usable in connection with the invention.
Figure 3B:
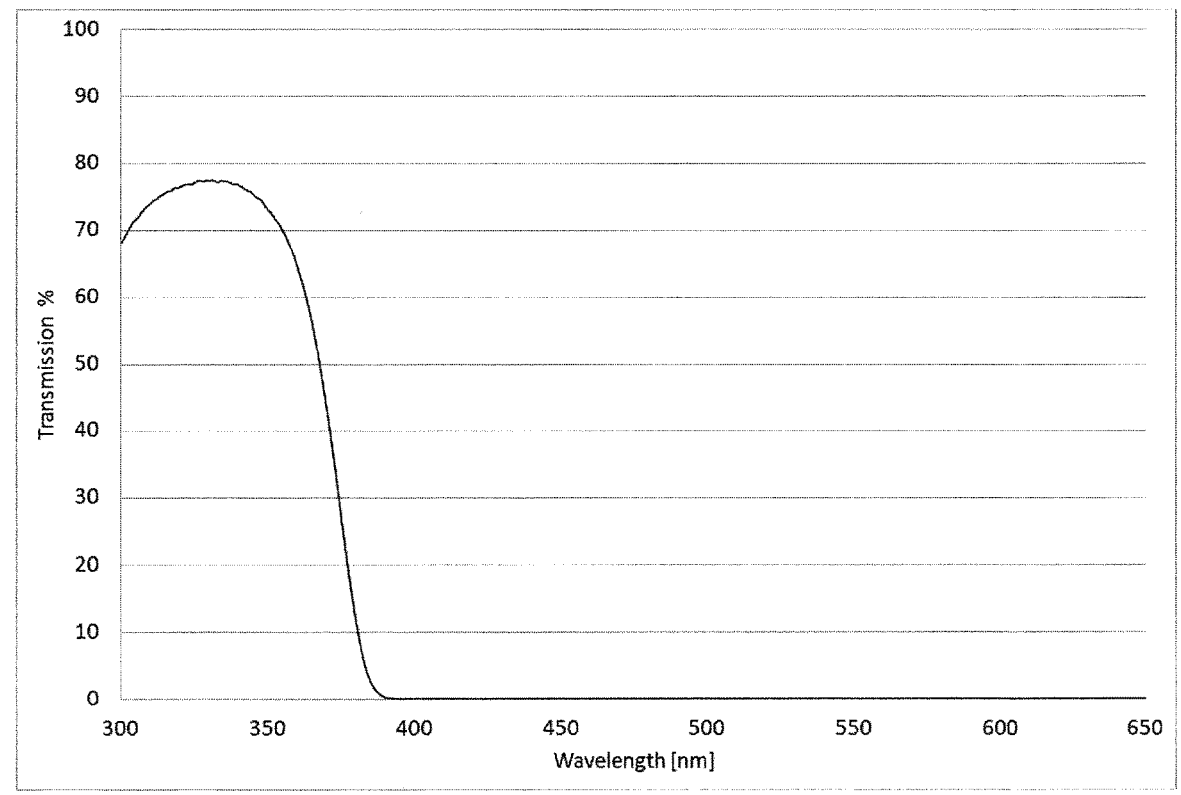
FIGS. 3B, 3C and 3D show exemplary transmission spectra of an UV band pass filter (3B) and white light band pass filters—interference filter (3C) and absorption filter (3D) useable in connection with a fluorescence imaging-enabled microscope according to one embodiment of the invention.

Existence of the visible wavelengths in UV radiation may be observed in FIG. 3A. Existence of undesired wavelengths rather than on maximum peak is valid also for other LEDs working at visible wavelengths. In an embodiment, blocking of unwanted wavelengths in an embodiment may be carried out on the basis of use of at least one absorption filter 11B having transmission spectrum shown in FIG. 3B.

The UV light source 10B, together with the filter 11B, may be arranged movably so that it may be brought to the optical axis 13 of the device, when in use, or away from it, when the white light source 10A is in use. For example, the light source may be supported by a shaft which is rotatable or translatable so that the light source 10B moves to respective positions.

The examples shown in FIG. 1B and FIG. 1C disclose the present transmission fluorescence microscope parts and enhanced fluorescent excitation using LED package comprise integrated band pass filter and light reflector in detail. Lens unit 15 may comprise one or more molded and antireflection coated polymer lenses—drawn as single lens to simplify the drawing—the refractive index of which is matched to give a desired color correction to the objective. In an embodiment, only one polymer lens may be used.

In an embodiment, the lens unit 15 may have a focal length of less than 5 mm. In an embodiment, the focal length of the at lens unit 15 may range 1 to 4 mm. In an embodiment, the focal length of the lens unit 15 may range 2 to 4 mm. When the lens unit 15 has a plurality of lens elements, a part of the lenses may also be made from glass. For automatic focus control i.e. moving the lens, dashed line rectangle marked lens compartment 15A may also contain electromechanical actuator which may be realized by means of voice coil or piezoelectric actuator.

Excitation LED 10B may have a glass lens emitter coupler 10D on top of the LED emitter for collecting light, shown in FIG. 1B1. In second type of embodiment shown in FIG. 1B2 glass lens 10D may be replaced with the band pass absorption filter material—used in 11B—and then it may form spherically shaped emitter coupler 10 E which may collect light and filter it simultaneously.

The configuration of FIG. 1B2 allows for the excitation source to be brought more close to sample compared to FIG. 1B1 configuration, thus enhancing excitation. In addition, in FIG. 1B2 emitter coupler 10E may have a specially formed surface on the side of the structure. This part may be coated with high reflective thin film 18 working at excitation wavelength.

In the configuration shown in FIG. 1B1 and also in FIG. 1B2 the $1^{st}$ band pass filter may be a dielectric interference filter 14A, thus enhancing excitation. Thus, incident light 17 may propagate to the specimen and reflect back from the surface 16.

In the embodiment of FIG. 1B2 this may also be performed, but in addition the high reflective thin film 18 back reflects 10F and intensifies the excitation again to specimen. This multiple excitation back and forth reflection enhances excitation of the fluorescent stained material. This may be an important issue because the high efficiency of the excitation means low power and easy thermal management solutions for portable mobile instrument.

FIG. 1C shows a detailed 3-dimensional view of mechanical construction of enhanced excitation source; 10E being excitation band pass absorption filter material and 18 high reflective thin film on the edge surface of the emitter coupler working at excitation wavelength.

High emission reflectance surface 18 has been drawn here to be flat. Part of it, i.e. the edges—not the part which is on the imaging path—may have a similar structure (not drawn here) and function as described for the surface 18 on the integrated emission LED. In that manner, the excitation source may comprise the reflective surface 18 configured to reflect light towards imaged area W2 of the specimen hold by the sample stage. The high reflection surface 18 may thus be used to reflect the light reflected from the stacked filter 14 through the specimen back to the specimen. That lowers the optical power requirement of the excitation source.

Figure 3C:
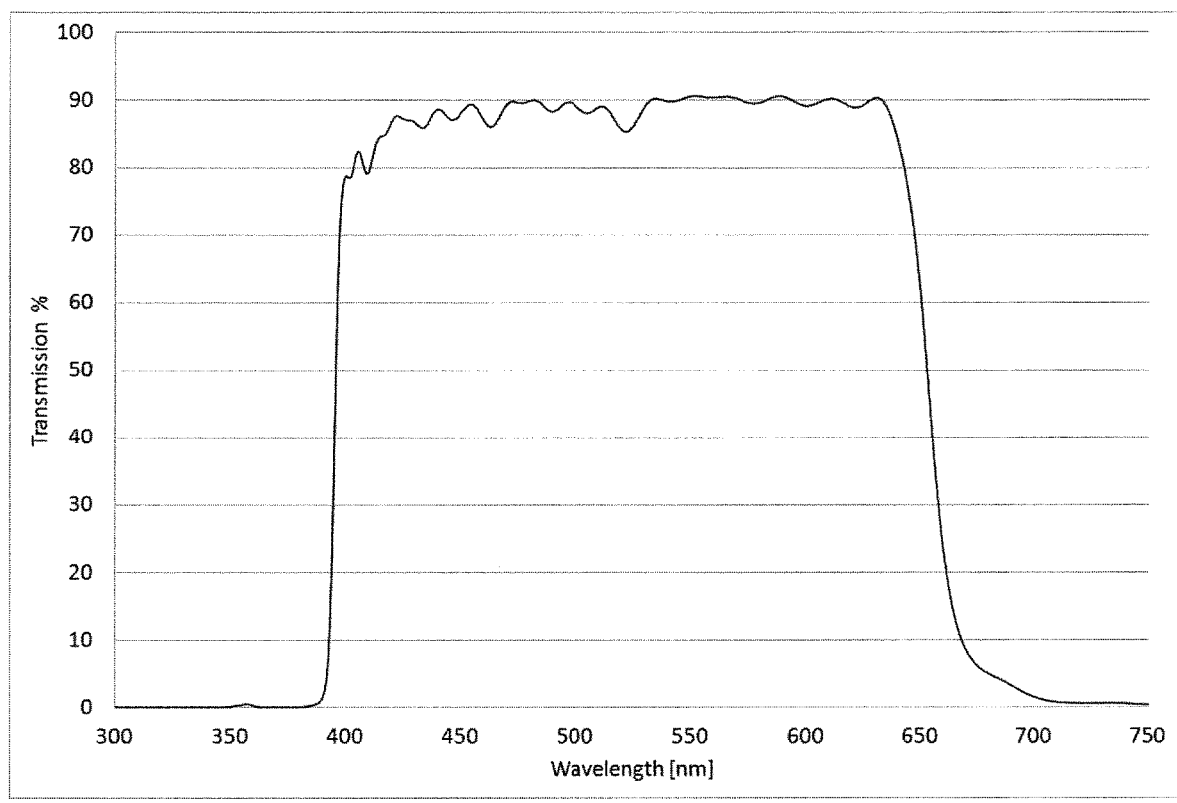

Above the lens compartment 15A, there may be arranged a visible wavelength band pass stacked filter 14. It serves to block any excitation wavelength, and possible infra-red (IR) radiation which has passed the sample. A typical transmission curve is shown in FIG. 3C. The 1st filter 14A may comprise a dielectric interference filter. The 1st filter 14A may take care of back reflection of the excitation wavelength to specimen. Several band pass filters may be stacked (14A, 14B, 14 C, 14 D) between the objective and the specimen in order to reach dark fluorescent background. Note that dielectric filters may be deposited on a single surface to obtain sufficient attenuation. The dielectric filter 14A may be on the top of the stacked filter 14.

Figure 3D:
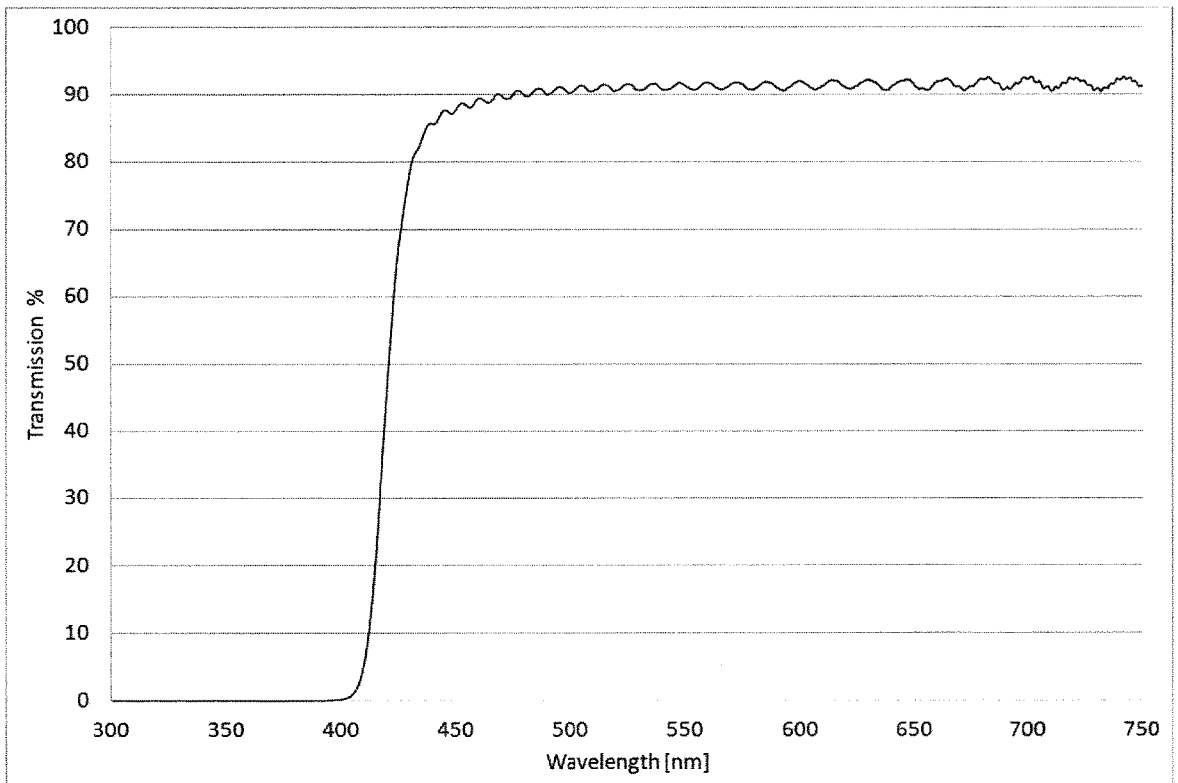

One of the band pass filters, namely 14C, shown in FIG. 1B1 may be an absorption filter to minimize light incident angle dependent leakage typically observed in usage of dielectric filters. Location of the absorption filter is preferably close to the objective in order to avoid auto fluorescence of the gelatin material itself. As an example, transmission spectrum of gelatin based Wratten 2A is shown in FIG. 3D. The stacked filter 14 may be configured to have extreme excitation wavelength attenuation properties. The stacked filter 14 is between the polymer lens 15 and the surface plane 12A on which the specimen is located in order to block the excitation light. That is, the stacked filter 14 prevents the UV light of the UV source 10B from propagating to the imaging panel 19. However, the stacked filter 14 passes fluorescent light which is visible light or some other light with wavelengths longer than the excitation light through for to be detected by the imaging panel 19.

As an example, transmission level of the commercially available single filter below 390 nm is typically less than 1%. In particular, there should be no or only insignificant overlap with the transmission ranges of the UV band pass filter 11B in connection with the UV light source 10B and visible band pass stacked filter 14.

The distance from the UV light source 10B to the sample may be kept short to keep the light intensity level high at the sample. In an embodiment, the distance may be 3 mm or less. Radiant flux level of tens of mill watts out of the UV Led, which may comprise Led Engin LZ-00U600 and which may have a beam angle $2\theta_{1/2}$ of 80° in emission pattern, for example, has proven to provide sufficient level of the excitation to DAPI stained malaria parasite nuclei having estimated volume of 0.125 µm$^3$ according to an embodiment described in FIG. 1B1. That is, the beam angle of the excitation light may be 80°, for example, where the beam angle is an angle with respect to the optical axis within which the optical power of an optical ray is equal to or more than 50% of the optical power of a ray at the optical axis. The beam angle closely refers to a full width at half maximum (FWHW) value. That kind of emission pattern results in non-collimated illumination of the illuminated area W2 and the stacked filter 14. The angle of incidence at the illuminated area W2 and the stacked filter 14 also varies correspondingly, all or a large part of the rays of the exciting light having the angle of incidence different from optical axis and the normal of the stacked filter 14. The angle of incidence at the stacked filter 14 may range 10° to 85°, for example.

Both the white light source 10A and the UV light source 10B may comprise one or more light-emitting diodes (LEDs) with corresponding emitting spectra, which may further be adjusted using one or more filters and/or diffusers. A single LED may locate directly at the optical axis 13.

In an example of FIG. 2, sample stage 26 may be spring loaded and manually focus hinge 24 controlled carbon fiber platform on which the movable support mechanism 23 for a standard-shaped or non-standard-shaped microscope glass may be attached. Knob 22 may be used for changing the white light bright field imaging to fluorescent imaging and vice versa. Bottom enclosure 21 may contain control electronics and give support for optical parts. White light and exciting light LED enclosure 20 may hold the specimen illumination modules together. Below the sample stage 26 there may be a changeable T-shaped magnet locked stick 25 which may hold the lens compartment 15A and UV/IR stacked filter 14 described in an example of the FIG. 1B.

According to an embodiment, the device may comprise an electromechanical translator for moving the support mechanism 23 in both lateral directions and optionally also in a direction parallel to the optical axis using hinge 24. This serves to aid an accurate positioning of the sample such that the desired spot to be imaged may be conveniently found.

The control system (not shown) of the microscope may allow for combining white light image capture and fluorescence image capture, whereby details of locations of stained points or areas in the specimen may be revealed.

Figure 4B:
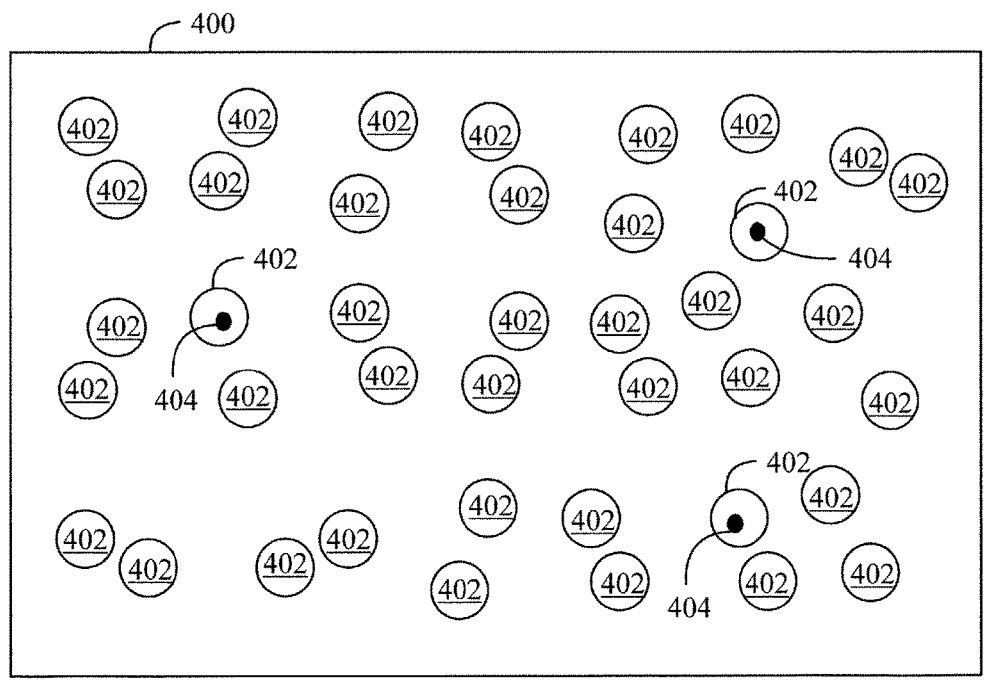
FIG. 4B illustrates an example of an image which is a combination of an image captured with excitation light and an image captured with white light.

FIG. 4B illustrates an example of an image 400 which is a combination of an image captured with excitation light and an image captured with white light. The image captured in white light shows red blood cells 402. The image captured in excitation light shows a DNA (DeoxyriboNucleic Acid) 404 of a micro-organism of a disease, which may be a DNA of a malaria parasite. In the image captured in excitation light alone there are only bright fluorescent spots of DNA 404 against black background (the bright fluorescent spots are illustrated as black spots in FIG. 4B). However, when an image is captured in white light it may show other details, such as the red blood cells 402. Because both the images may be captured using the different light sources (fluorescent light source and white light source) but using the same optical axis without moving the sample stage and the sample hold by the sample stage, the images can directly be combined. The combination is possible because the images have the same magnification which, in turn, is the result of the common optical magnification unit with the at least one polymeric lens. As can be seen, from the combined image 400 it is possible to determine whether the alien DNA 404 is inside the blood cells 402 or outside the blood cells 402, for example.

The total distance from the topmost light source, i.e. the white light source 10A to the surface of the detector 19 may be as low as 40 mm, and from the UV light source 10B to the detector 19 surface may be as low as 25 mm. Reflecting mirrors may further be used for minimizing the volume of the structure. The total outer lateral dimensions of 60 mm×100 mm may be achieved height being in the order of 30 mm.

Figure 5:
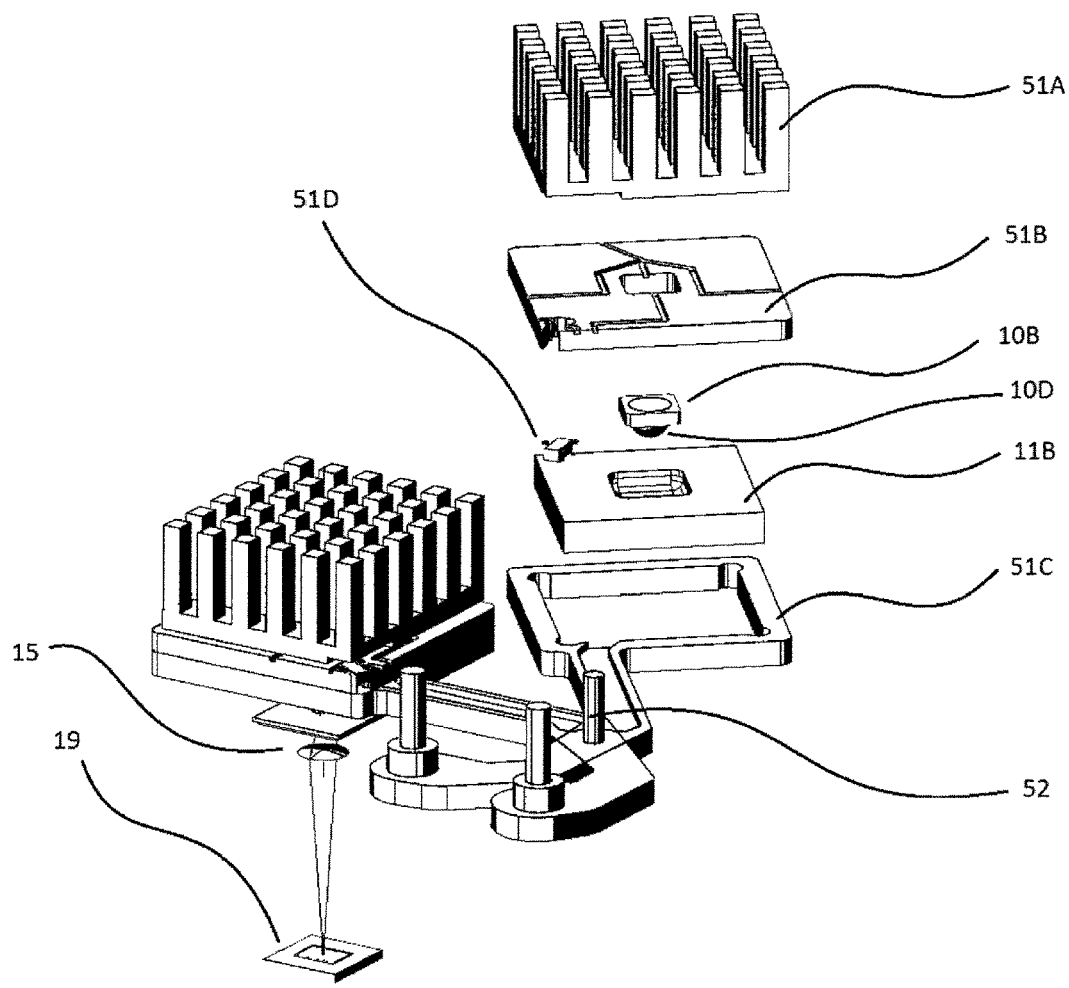
FIG. 5 shows an example of a 3-dimensional view of mechanical construction of the LED excitation setup according to one embodiment.

In the example of FIG. 5, excitation UV LED 10B containing light collecting lens 10D—made from visibly transparent glass—may be embedded to printed circuit board (PCB) 51B having also sensor 51D on board for monitoring temperature. Heat sink 51A may cool down the excessive heat generated during operation of the LED. Band pass filter 11B—U340 (Edmund Scientific)—may have a milled cavity reserved for the LED and on which the PCB assembly may be inserted. The total visible light optical density (OD) achieved may be 5.5. Excitation LED assembly may be inserted to an arm 51C which may be rotated using shaft axis 52. According to an embodiment, the device may comprise an electromechanical translator for moving the described assembly automatically around the shaft 52. Fluorescence image may be captured when the exciting light LED assembly is moved to center position of the optical axis.

Figure 6:
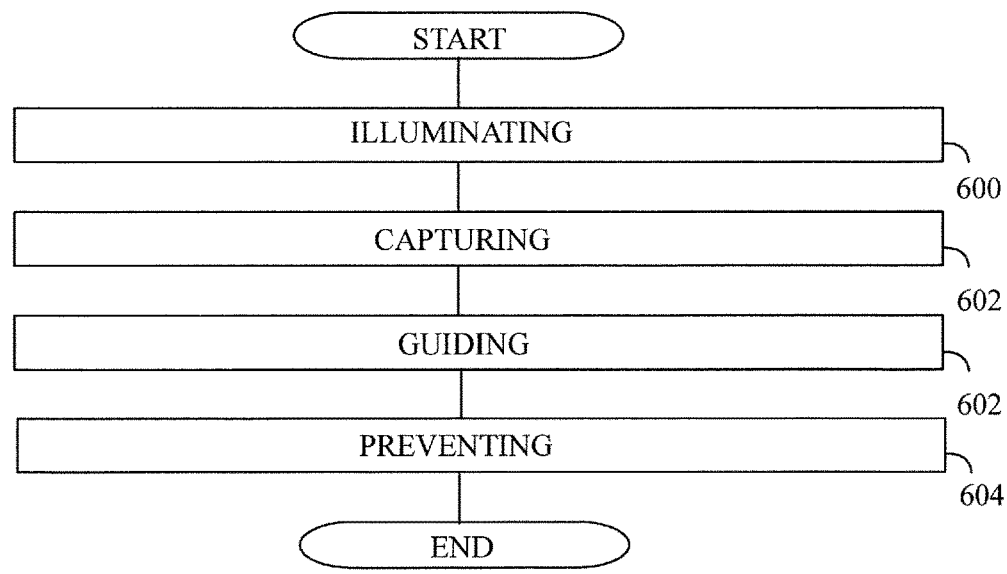
FIG. 6 shows an example of a flow chart of the imaging method.

FIG. 6 illustrates an example of the imaging method by the mobile and/or microscope, the method being based on a transmission fluorescence mode. In step 600, an imaged area is illuminated for illuminating a sample on a sample stage by at least one exciting light source with non-collimated excitation light. In step 602, an image of the imaged area for imaging the sample is captured by an imaging panel with fluorescent light generated by the sample in illumination of the excitation light. In step 604, light from the illuminated sample is guided with at least one polymeric lens of an optical magnification unit between the sample and the imaging panel to the imaging panel for forming a magnified image of at least portion of the sample at the imaging panel. In step 606, the non-collimated excitation light and light of auto fluorescence of the at least one polymeric lens is prevented from propagating to the imaging panel with at least one stacked filter which comprises a dielectric filter and an absorption filter, the dielectric filter being located the between absorption filter and the sample stage for the dielectric filter to reflect the excitation light towards the imaged area, the stacked filter being located between the surface plane of the sample stage and the at least one polymeric lens.

Above a small size and an inexpensive mobile microscope which is capable of common diagnosis imaging by transmission fluorescence method using polymer lenses in magnifying objectives is introduced. Magnifying objectives are either in a common type microscope or in a special type reversed camera lens configuration. Combined fluorescence and bright field imaging is an advantage to be exploited because the fluorescence may easily resolve targeted diseases in size beyond the imaging resolution.

Of the optical systems, either epi-fluorescence or transmission fluorescence are methods may be considered here. These methods, when appropriate, may be configured in wide field, confocal, spinning disk and total internal reflection fluorescence (TIRF) modes, to mention some. If we take the simplest wide field mode, applicable for both methods, polymer lenses in the solution presented above may practically be used in transmission fluorescence mode. The reason for this is the auto fluorescence of polymer materials, which is notably high at UV excitation and observed also disturbing at visible wavelengths. The Epi-fluorescent method may be configured such that the excitation is applied from the side where the imaging is performed, causing an objective made from polymers to be an impractical approach. Instead, transmission fluorescent method allows polymer lens based construction to be realized and thus to be utilized in mobile microscope POC purposes.

Features of Microscope

The mobile field microscope presented above enables miniaturized transmission fluorescence and bright field. Inexpensive plastic molded objective, LED excitation, illumination and optical filters, diffuser and imager may be integrated together in a manner that distances between the functional elements are short which results in a compact and easily portable microscope.

Realization of efficient excitation source in a small size and elimination of auto fluorescence is preferred. Plastic polymers lenses and color or monochrome imagers on chip polymer layers like color filters and light collecting micro lenses impairs the dark background commonly required to be of high quality in imaging. Sufficient irradiance level from the LED excitation is desired for obtaining stained specimen to emit enough fluorescent light. High quality excitation filter as well as superb performance emission filter construction is also desired to obtain dark fluorescence image background. Optimization of bright field illumination in order to obtain flat light intensity field needs be carried out. Reduced length of the microscope's optical path reduces the size of the microscope instrument. The microscope is also optically suitable for cell level point-of-care diagnostics at a smaller cost than before.

How the Features have been Achieved

Optimization of an efficient excitation light source in small size may be realized by using transmission fluorescence method in which the excitation source is in the closest vicinity of the sample and is based on light emitting diode (LED) without using large size, separate collector and condenser lenses to direct the excitation. Large collector and condenser lenses are often used if the excitation source is relatively far from the sample. LED used for excitation requires efficient low pass filters in order to block wavelengths at fluorescent emission spectrum. This excitation filter may be either based on dielectric interference filters or absorption filters. Absorption filter type is preferred here because it allows functional integration to excitation LED by two means. Firstly, it is made from glass allowing support for functional parts and secondly it may be shaped in a proper manner together with the integrated LED package. Shaping of the absorption filter denotes here manufacturing of spherical light collecting lens block and high reflectance surfaces at emission wavelength. In detail, lens block also has a specifically formed ring shaped high excitation wavelength reflectance surface which reflects the excitation wavelength back to the stained specimen.

It is well known that the plastic polymers are causing auto fluorescence when exposed to UV light or even visible light. In our imaging system both the objective polymer lens assembly auto fluorescence as well as imager's on chip polymer layer color filter and light collecting lens auto fluorescence destroys the high quality dark background required in imaging without proper filter positioning. This invention relates to a condition in which the stacked filter 14 is located between the magnifying objective and a position of the specimen. This is not being used at all in common transmission fluorescence setups.

Selection of emission filter location serves two goals. Firstly, eliminating the excitation related auto fluorescence and secondly, intensifying excitation by reflecting excitation wavelengths back to specimen as the first emission filter against the specimen is a dielectric interference filter. This system together with integrated excitation LED package makes intensification of excitation even larger utilizing back and forth excitation reflections. It must be emphasized that the chosen structure for intensification is valid also for all wavelengths used in fluorescence microscopy.

Emission filter must block the excitation. Typically the required attenuation, like in the presented implementation example, may be achieved by stacking several band pass filters on top of the objective lens. High performance dielectric filters may be manufactured on a single surface but if using only dielectric filters light incident angle dependent leakage might cause problems achieving high quality dark background. In this case one of the stacked filters may be an absorption filter locating as close as possible to the magnifying objective, thus eliminating possible auto fluorescence of the filter itself.

Fixed short distance bright field white light requires diffuser structures in a proper manner constructed in order to obtain highest imager's areal signal-to-noise (S/N) ratio in the image i.e. flat field. This may be done by using white light LED in which the coupled irradiation pattern will be matched together with systems vignette errors. In detail, the system has a gradient diffuser in which the optical axis light path will be attenuated more than corner and side light paths. This may be done inexpensively in means of modulating the thickness of visible wavelength permeable volume diffuser preferably made from plastics.

In addition, the present mobile microscopic imaging device comprises a sample stage for holding a sample to be imaged, at least one light source for backlight illumination of the sample, a digital imaging panel capable of capturing an image of the sample during the transmitted light illumination, and optical magnification unit between the sample and the imaging panel for guiding light from the sample to the imaging panel so that a magnified image of at least portion of the sample is formed at the imaging panel. According to the invention, the optical magnification unit comprises a polymeric lens assembly either in a common type tubus length shortened miniaturized microscope or in a special type reversed camera lens configuration.

Advantageous Effects

The solution explained in this application provides considerable advantages. In particular, due to sufficient optical capabilities of polymeric lenses, the detector distance to the objective lens may be maintained low in order to maintain short optical paths. In combination with backlight illumination arrangement, this aids in miniaturization of the whole device to a truly mobile level. The optical quality of plastic lenses has proven to be sufficient for demanding cell level point-of-care diagnostics. The cost of the plastic lens optics is, however, only a fraction of corresponding glass lens optics.

A particularly advantageous implementation of the backlit microscope is one with a polymeric lens assembly, integrated and selectable white light and exciting light sources and a semiconductor detector, in particular a CMOS detector. This allows for high S/N ratio fluorescence imaging of small targets and in field conditions.

According to one embodiment, the optical magnification unit comprises of a polymeric lens assembly in a common type tubus the length of which is shortened resulting in a miniaturized microscope. The portable microscope may have a focal length less than 5 mm. The focal length may be 1-4 mm, for example.

According to an embodiment, the optical magnification unit comprises of a polymeric lens assemblies in a special type reversed camera lens configuration.

According to an embodiment, the microscope comprises a combination of one or more LED backlights, a small size color corrected objective lens, a color or monochrome detector. The lens assembly is manufactured from inexpensive molded plastic materials and comprises a focusing system.

According to an embodiment, the device comprises at least two light sources selectively positional to optical axis of the imaging device for illumination of the sample with different optical spectra, at least one of the light sources being a white light source and at least one excitation source. This allows for so-called bright light imaging, fluorescence imaging and for combination thereof for a single sample. The white light source preferably comprises one or more white light LEDs and a flat field volume gradient diffuser. The excitation light source preferably comprises one or more LEDs, preferably covering the absorption spectrum of the fluorescence staining media, and an excitation band pass filter.

Implementation Example

A mobile microscope may be built according to the design principles described above and shown in FIG. 1A, for example. At least one inexpensive plastic optical element used in mobile phone camera systems may be employed. The tube length of the microscope built may be decreased to about one tenth of a common microscope, for example, to about 16 mm, in order to reduce the size. Normal microscopes, using changeable objectives, which are used for forming different magnifications, yield captured image sizes from about 100 µm to 400 µm, whereas the microscope with the at least one plastic optical element may have a captured image size in the range of about 1000 µm, for example. The microscope may have a maximum fixed field of view of about 1.0×0.7 mm² which is the imaged area W2. When using the maximum array size (2592×1944) the pixel size in the image may be about 400 nm.

The white light source may comprise a white LED, comprising blue emission LED, and adjacent polycrystalline fluorescence material, producing continuous visible spectrum. This may be a good enough solution for imaging.

A white light LED volume diffuser flatten the light field on the imager. Of various different diffuser types, a plastic transmission volume diffuser may be suitable. The diffuser may have a special feature of minimizing texture reflections when light passes through the relatively thick plastic material.

The system may have a fluorescence imaging mode. A goal may be to achieve adequate UV LED excitation level for DAPI stained malaria parasites. Malaria parasite in smallest size is below the resolution limit of the instrument if the microscope is used in white light bright field mode which is normally used for conventional Giemsa stained blood smears. Nevertheless, when fluorescence imaging is used, resolution limit in this case is a secondary issue. Even if fluorescent object is smaller than the resolution limit, the object may still be distinguished, because the light emission from the fluorescent object makes it visible.

Application

A sample on microscopy glass may be oriented so that glass is on top side and it is placed to a movable support mechanism 23. Maximum usable area for capturing images on the microscope glass is about 54×25 mm² centered. An USB connected camera module having Omnivision 5640 5MP BSI sensor, which has a pixel size of about 1.4 µm, may be used as the detector 19. The lens system of the module may be modified by taking the lens out of the sensor module and inserting it to a new reversed position forming a short tube length microscope. Focal length of the lens may be about 3.42 mm, for example. Fine focusing may be performed using electrically controlled voice coil actuator (VCA) integrated on the lens. The maximum fine focus movement of the VCA lens may be about 250 µm, for example.

The lens may be positioned in the system so that the integrated UV/IR stacked filter 14 in the sensor module may be on top of the lens stack. This filter set may block UV from UV LED emission, which otherwise causes auto fluorescence interference on both the plastic lenses as well as on camera color filters.

A microcontroller and system electronics board may be used for controlling LED intensity levels and adjusting fine focus. Manual coarse focusing may be carried out utilizing a movable handle, shown in FIG. 2.

Fluorescence imaging with the mobile microscope may be tested using DAPI (4', 6-diamidino-2-phenylindole) as a fluorescent stain that binds strongly to A-T rich regions in DNA. It is used extensively in fluorescence microscopy. DAPI may pass through an intact cell membrane therefore it may be used to stain both live and fixed cells, though it passes through the membrane less efficiently in live cells and therefore the effectiveness of the stain is lower.

Efficient fluorescence imaging on blood cells may require that the white light image from the same region is combined with the fluorescence image in order to distinguish the source. Thus, the sample may be fixed before staining.

INDUSTRIAL APPLICABILITY

The present technology may be used for providing high-quality mobile microscopy in applications that require or benefit from instant optical analysis of small targets, in particular in field conditions. The present microscopes may be used in permanent laboratories, but also as parts of movable laboratories, because they are mobile and durable.

An application of the microscope may be for analysis of body fluids, such as urine and blood samples by microscopy for diagnostic purposes.

Other analysis may be for other fields like microelectronics, biology, nanophysics, pharmaceutics and mineralogy, for example.

It will be obvious to a person skilled in the art that, as technology advances, the inventive concept can be implemented in various ways. The invention and its embodiments are not limited to the example embodiments described above but may vary within the scope of the claims.

The invention claimed is:

1. A mobile microscopic imaging device wherein the mobile microscopic imaging device is based on a transmission fluorescence mode comprises
   a sample stage for holding a sample to be imaged;
   at least one excitation light source which is positioned to an optical axis of the transmission fluorescence mode of the device adjacent to the sample stage, the at least one excitation light source being configured to emit non-collimated excitation light in order to illuminate an imaged area for illuminating the sample on a surface plane of the sample stage;

an imaging panel configured to capture at least one image of the imaged area for imaging the sample with fluorescent light generated by the sample under illumination of the excitation light;

an optical magnification unit between the sample and the imaging panel for guiding light from the sample, which is illuminated, to the imaging panel for forming a magnified image of at least one portion of the sample at the imaging panel, said optical magnification unit comprising at least one polymeric lens, and at least one stacked filter which comprises a dielectric filter and an absorption filter, the dielectric filter being located between the absorption filter and the sample stage for the dielectric filter to reflect the excitation light towards the imaged area; and the stacked filter is located between the surface plane of the sample stage and the at least one polymeric lens, and the at least one stacked filter is configured to prevent the non-collimated excitation light of the at least one excitation light source and light of auto fluorescence of the at least one polymeric lens from propagating to the imaging panel.

2. The imaging device according to claim 1, wherein the mobile microscope imaging device is a miniaturized microscope set up realized on the basis of the at least one polymeric lens.

3. The imaging device according to claim 1, wherein a plurality of the at least one polymeric lens is in a reversed camera lens configuration.

4. The imaging device according to claim 1, wherein each of the at least one polymeric lens comprises a body made from a unitary piece of polymer.

5. The imaging device according to claim 1, wherein the excitation light source is configured to emit light in the at least one of the following: UV and visible region, for causing fluorescence in the sample.

6. The imaging device according to claim 1, wherein the optical magnification unit comprises at least one filter for band passing visible light, the at least one filter being configured to suppress the excitation light.

7. The imaging device according to claim 6, wherein the at least one filter for band passing visible light is positioned between the surface plane of the sample stage and the magnification unit.

8. The imaging device according to claim 1, wherein the excitation light source and at least one white light source are selectively positional to optical axis of the imaging device without moving the sample stage and the sample hold by the sample stage and configured to illuminate the sample with different optical spectra.

9. The imaging device according to claim 8, wherein the white light source comprises one or more white light light-emitting diodes (LEDs) and a flat field volume gradient diffuser.

10. The imaging device according to claim 1, wherein the excitation light source comprise one or more LEDs.

11. The imaging device according to claim 10, wherein LEDs forming the excitation light source are embedded into or placed onto filter material of said at least one filter configured to band pass excitation light, and the light source comprising the LEDs for the excitation light and the band pass filter is arranged to be movable in combination to and out of the optical axis of the device.

12. The imaging device according to claim 1, wherein the excitation source comprises a reflective surface configured to reflect the excitation light towards the specimen hold by the sample stage.

13. The imaging device according to claim 1, wherein the imaging device has a maximum outer dimension of 15 cm or less.

14. A mobile microscopic imaging device wherein the mobile microscopic imaging device is based on a transmission fluorescence mode comprises a sample stage for holding a sample to be imaged;

at least one excitation light source which is positioned to an optical axis of the transmission fluorescence mode of the device adjacent to the sample stage, the at least one excitation light source being configured to emit non-collimated excitation light in order to illuminate an imaged area for illuminating the sample on a surface plane of the sample stage;

an imaging panel configured to capture at least one image of the imaged area for imaging the sample with fluorescent light generated by the sample under illumination of the excitation light;

an optical magnification unit between the sample and the imaging panel for guiding light from the sample, which is illuminated, to the imaging panel for forming a magnified image of at least one portion of the sample at the imaging panel, said optical magnification unit comprising at least one polymeric lens, and at least one stacked filter which comprises a dielectric filter and an absorption filter, the dielectric filter being located between the absorption filter and the sample stage for the dielectric filter to reflect the excitation light towards the imaged area; and the stacked filter is located between the surface plane of the sample stage and the at least one polymeric lens, and the at least one stacked filter is configured to prevent the non-collimated excitation light of the at least one excitation light source and light of auto fluorescence of the at least one polymeric lens from propagating to the imaging panel, wherein the mobile microscopic imaging device comprises at least one magnifying objective comprising the at least one polymeric lens for analysis of samples based on imaging by transmission fluorescence.

15. The mobile microscopic imaging device according to claim 14, wherein the transmission fluorescence is provided by LED excitation.

16. The mobile microscopic imaging device according to claim 15, the samples for diagnostic purposes comprise at least one body fluid selected from the group consisting of urine, sweat, tear drops and blood samples.

17. A method of imaging by a mobile microscopic imaging device, the method being based on a transmission fluorescence mode and comprising illuminating, by at least one light exciting source, an imaged area for illuminating a sample on a sample stage with non-collimated excitation light;

capturing, by an imaging panel, at least one image of the imaged area for imaging the sample with fluorescent light generated by the sample under illumination of the excitation light;

guiding, with at least one polymeric lens of an optical magnification unit between the sample and the imaging panel, light from the illuminated sample to the imaging panel for forming a magnified image of at least one portion of the sample at the imaging panel, and preventing the non-collimated excitation light and light of auto fluorescence of the at least one polymeric lens from propagating to the imaging panel with at least one stacked filter which comprises a dielectric filter and an absorption filter, the dielectric filter being located between the absorption filter and the sample stage for the dielectric filter to reflect the excitation light towards the imaged area.

* * * * *